March 19, 1929. J. A. DAILEY ET AL Re. 17,239

RAILROAD GRADE CROSSING

Original Filed Nov. 16, 1926 2 Sheets-Sheet 1

INVENTORS
JOHN A. DAILEY
L. W. GERTH
By Paul, Paul & Moore
ATTORNEYS

March 19, 1929. J. A. DAILEY ET AL Re. 17,239
RAILROAD GRADE CROSSING
Original Filed Nov. 16, 1926 2 Sheets-Sheet 2
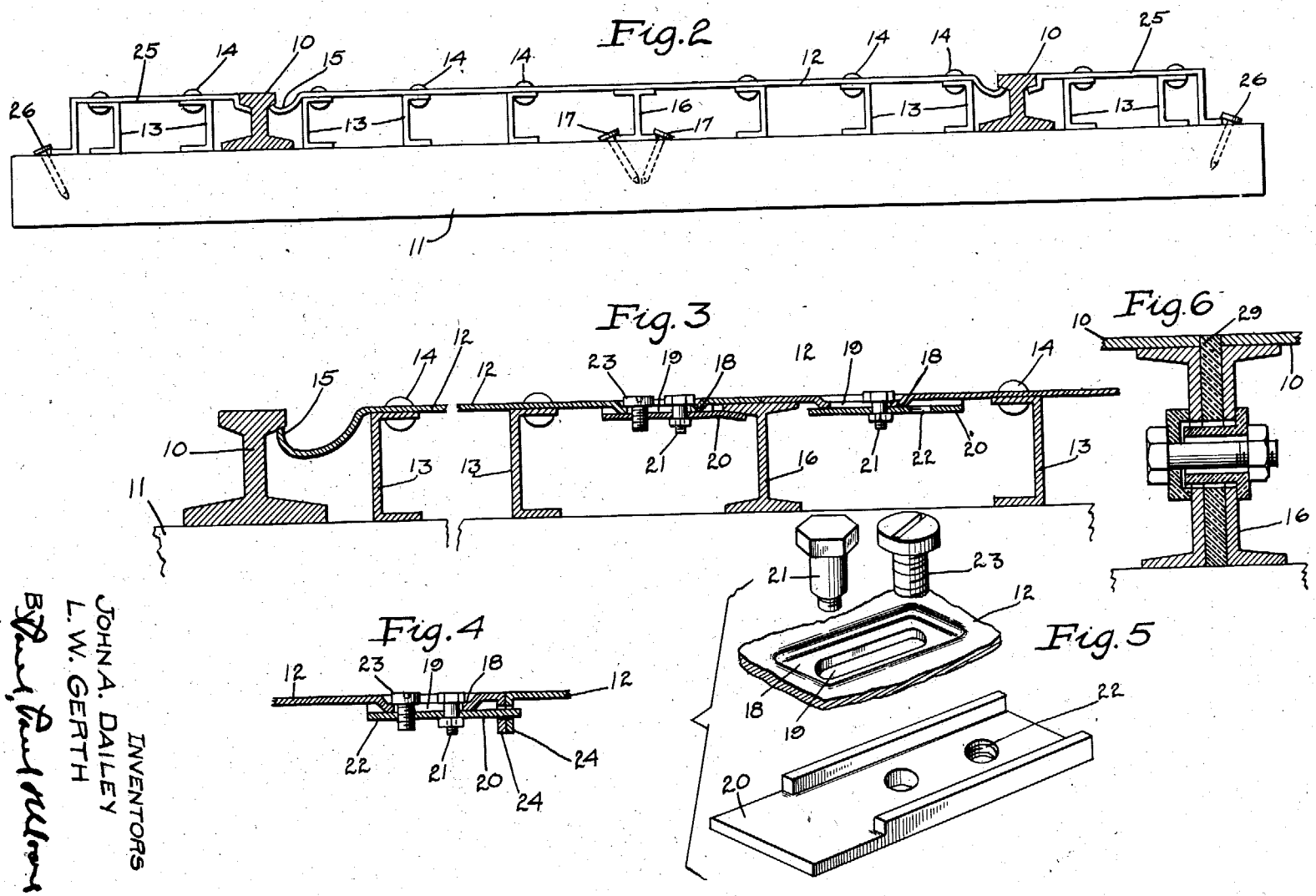
INVENTORS
JOHN A. DAILEY
L. W. GERTH
By Paul, Paul & Moore
ATTORNEYS Reissued Mar. 19, 1929. Re. 17,239

UNITED STATES PATENT OFFICE.

JOHN A. DAILEY AND LEWIS W. GERTH, OF BURLINGTON, IOWA.

RAILROAD GRADE CROSSING.

Original No. 1,623,911, dated April 5, 1927, Serial No. 148,644, filed November 16, 1926. Application for reissue filed February 6, 1929. Serial No. 338,000.

This invention relates to an improvement in railroad grade crossings, and an object is to provide a plurality of metallic plates interposed between the rails of a track and supported on beams or standards extending lengthwise of the plates for supporting the plates on a level with the treads of the rails.

Another object is in the provision of locking means for maintaining the plates in contiguous relation and in the same plane so that a level and uniform surface is presented to traffic.

The invention consists of certain other novel features of construction and combinations of parts which will be hereinafter described and pointed out in the claims.

In the accompanying drawings:

Figure 2 is a transverse vertical sectional view;

Figure 3 is an enlarged vertical sectional view illustrating the manner of joining the longitudinal edges of two of the plates to the central beam or support;

Figure 4 is an enlarged detail sectional view of the fastening means for locking the adjacent ends of two plates together;

Figure 5 is a perspective view of the locking bar, and recessed portion of the plates for the bolts.

Figure 6 is a detail sectional view insulated I-beam.

Figure 1:
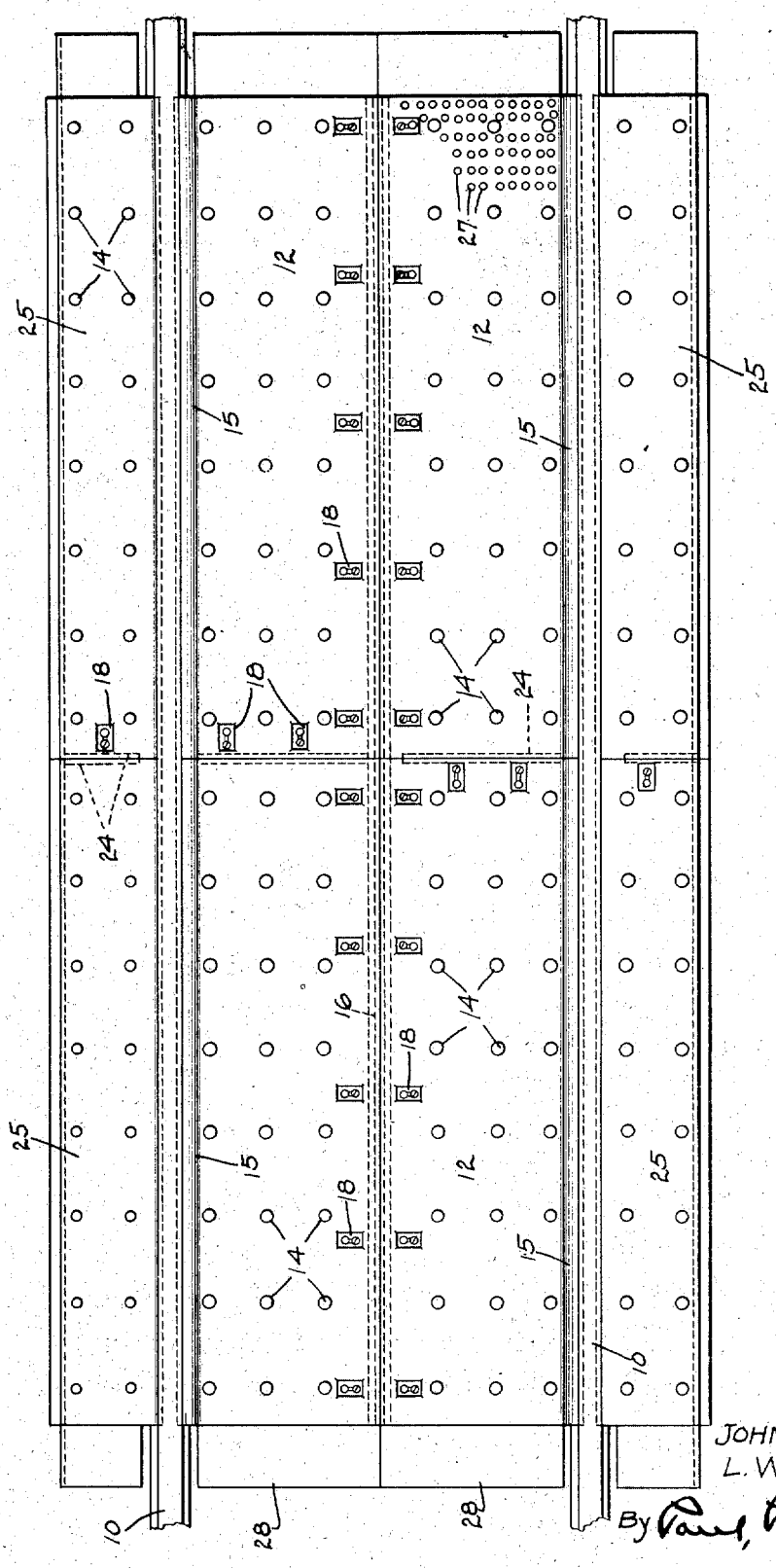
Figure 1 is a top plan view.

The rails 10, 10 are preferably supported on ties 11, but in constructions where ties are not employed they will be supported on a suitable ballast. Located between the rails are a plurality of metallic crossing plates 12, 12, there being two plates arranged parallel and as shown four plates are employed in making up the crossing between the rails.

Each plate is provided with a series of channel beams or supports 13, which rest upon the ties 11 and are connected to the plates by rivets 14, 14. The outer edge of each plate 12 is bent or formed in the shape of a trough 15, the outer edge of which is located beneath the tread of the rail 10, to form a drain for the crossing and prevent objects from getting wedged or confined between the edges of the plates and tread of the rails.

Located midway of the rails 10 and extending parallel therewith throughout the length of the crossing is an I-beam 16, which is preferably held in place by means of spikes 17 driven into the ties 11. The inner edges of the plates 12 rest upon the upper surface of the I-beam and are held in abutting relation. Arranged along the inner longitudinal edges of the plates 12 and on the upper surface thereof are a number of transverse depressions 18, 18, the bottoms of which are slotted as at 19. Rectangularly shaped bars 20 are supported along the edges of the plates 12 by means of bolts 21 which pass through the locking bars 20 and are fastened thereto by nuts. The bolts 21 are supported in the depressions 18 of the plates and slide in the slots 19 in moving the locking bars into and out of engagement with the flanges of the I-beam 16 for fastening the plates 12 to the I-beams. The locking bars 20, are each provided with an additional screw-threaded opening 22, for the reception of a locking screw bolt 23, which is inserted through the slot 19 and screwed into opening 22 for holding the locking bar in locked position and against jarring loose or becoming disengaged from the beam. The heads of the bolts 21 and 23 are received in the depressions 18 so that they lie flush with the upper surface of the plates 12.

The inner or adjoining ends of the plates 12 are provided with downturned flanges 24, (Fig. 4), and these flanged ends are held together with locking bars 20, similarly constructed and supported by the plates, as above described.

Approach plates 25, 25 are located along the outer sides of the tracks or rails 10, and are supported by channel beams 13. The inner edge of the plates 25 is bent downwardly and beneath the tread of the rail, while the outer edge is bent downwardly and rests on the projecting ends of the ties 11, where they are held against movement by means of spikes 26. The inner or adjoining ends of the plates 25 have downturned flanges fastened together by means of the locking bar 20 as provided for the plates 12.

The upper surface of the plates 12 and 25 will be provided with a knobbed surface 27 to afford a traction or gripping surface.

The outer ends of the plates 12 and approach plates 25, extend downwardly as at 28, 28 and rest upon the ties or ballast, and thereby prevent abrupt approaches at the ends of the crossing and the danger of the air hose and chains attached to a car engaging the ends of the crossing.

In instances where the crossing is employed with electric railways, or highways employing electric switches and signals, the I-beam 16 will be preferably made in sections and provided with insulation 29.

We claim as our invention:

1. A railroad crossing, comprising plates extending parallel with and between the rails of a track and having the inner edges thereof abutting, and means mounted on the plates at their abutting edges and adapted to be projected beyond the abutting edges for holding the plates in the same plane.

2. A railroad crossing, comprising plates extending parallel with and between the rails of a track and having the inner edges thereof abutting, said plates having down turned flanges at their adjoining ends and bars movably mounted on the plates at the abutting edges and adjoining ends, said bars projecting beyond the abutting edges for maintaining said edges in the same plane, and the bars at the ends of the plates projecting through the down-turned flanges for fastening the ends together.

3. A railroad crossing, comprising rails and a beam extending therebetween and parallel therewith, plates located between the rails and having their inner edges resting on the beam, and fastening means carried by the plates at their abutting edges adapted to be projected there-beyond for engaging the beam for holding the plates in position.

4. A railroad crossing, comprising plates extending parallel with and between the rails, locking bars slidably mounted on the plates and adapted to be projected beyond the edges thereof for holding the plates in place, and means for holding the locking bars in projected position.

5. A railroad crossing, comprising plates extending parallel with and between the rails, locking bars slidably mounted on the plates along the edges thereof and adapted to be projected beyond the edges of the plates for holding the plates in place.

6. A railroad crossing, comprising plates extending parallel with and between the rails, locking bars mounted on the plates and adapted to be projected beyond the edges of the plates for fastening them in position, and means for holding the bars in projected position.

7. A railroad crossing, comprising rails and a beam extending therebetween and parallel therewith, plates located between the rails and having their inner edges resting on the beam, metallic supports connected to the underside of the plates and extending lengthwise thereof, and locking bars carried by the plates for engaging the beam and adjoining ends of the plates for holding them in position.

8. A railroad crossing comprising a beam adapted to be placed centrally between the track rails and parallel therewith, plates arranged in parallel relation between the track rails and having abutting edges seated on said beam, supports for said plates secured thereto intermediate to said beam and the track rails, the outer portions of said plates extending beyond the outer supports and adjacent the under side of the rail heads.

9. A railroad crossing comprising rails and a beam extending therebetween and located substantially midway in the space between said rails, means securing said beam to the railway ties, plates extending longitudinally of the rails with their inner portions resting upon said beam and their outer edges shaped to extend under the treads of the rail heads, supports extending longitudinally in the spaces between the rails and the central beam and resting upon the railway ties and means securing said plates to said supports.

10. A railroad crossing comprising rails and a beam extending therebetween and located substantially midway in the space between said rails, means securing said beam to the railway ties, plates extending longitudinally of the rails with their inner portions resting upon said beam and their outer edges shaped to extend under the treads of the rail heads and form troughs inside of the rail heads, flanged supports extending longitudinally in the spaces between the rails and the central beam and resting upon the railway ties and means securing said plates to said flanged supports.

11. A railroad crossing, comprising channel beams, plates projecting laterally on each side of said beams, a support beam adapted to be placed midway substantially between the track rails parallel therewith, said plates and channel beams fitting between said support beam and the track rails, the inner extending portions of said plates being seated on said support beam, the outer extending portions of said plates projecting under the adjacent rail head, the plates upon each side of said support beam being riveted to a flange of the channel beams on that side whereby the channel beams and plates secured thereto can be handled as one piece and conveniently placed in working position between the track rails.

12. In a railroad crossing, approach plates having inner edges formed to fit the outer faces of the track rail heads, supports for the middle portion of said plates, the outer portion of said approach plates being downwardly turned and having a foot piece to rest upon the tie and be spiked thereto.

13. A railroad crossing comprising flanged supports, plates projecting laterally on each side of said supports, a beam adapted to be placed midway substantially between the track rails parallel therewith, said plates and said supports fitting between said beam and the track rails, the inner extending portions of said plates being seated on said beam, the outer extending portions of said plates projecting under the adjacent rail-head, the plates upon each side of said beam being riveted to a flange of the support on that side whereby the supports and plates secured thereto can be handled as one piece and conveniently placed in working position between the track rails.

In witness whereof, we have hereunto set our hands this 23 day of January, 1929.

LEWIS W. GERTH.
JOHN A. DAILEY.